United States Patent
Gaudet et al.

(10) Patent No.: US 6,480,498 B1
(45) Date of Patent: Nov. 12, 2002

(54) HIGH SPEED NETWORK SWITCH BUS CLOCK

(75) Inventors: Brian Gaudet, Bethlehem, PA (US); Vickie Pagnon, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/108,874

(22) Filed: Jul. 1, 1998

(51) Int. Cl.[7] ............................................... H04L 12/46
(52) U.S. Cl. ........................................ 370/402; 370/503
(58) Field of Search ................................. 370/360, 445, 370/451, 364, 401, 503, 385, 384, 402; 375/257, 354

(56) References Cited

U.S. PATENT DOCUMENTS

| | | | | |
|---|---|---|---|---|
| 4,010,326 A | * | 3/1977 | Schwartz | 179/15 |
| 4,847,867 A | * | 7/1989 | Nasu et al. | 375/36 |
| 5,432,823 A | * | 7/1995 | Gasbarro et al. | 375/356 |
| 5,452,330 A | * | 9/1995 | Goldstein | 375/257 |
| 5,596,578 A | * | 1/1997 | Cunningham | 370/364 |
| 5,901,146 A | * | 5/1999 | Upp | 370/389 |
| 6,061,348 A | * | 5/2000 | Castrigno et al. | 370/363 |

OTHER PUBLICATIONS

"High–Performance Bus Interface Designer's Guide (Futurebus+, PI–Bus, BTL)"; National Semiconductor Corporation, Santa Clara, California; pp. 1–80—1–93; 1992 Edition.

* cited by examiner

*Primary Examiner*—Ken Vanderpuye
(74) *Attorney, Agent, or Firm*—Stallman & Pollock LLP

(57) ABSTRACT

A high-speed network switch includes a data bus for transmitting data between devices. The data bus includes a plurality of data lines and a clock line. As packet data is received by the high-speed network switch, the packet data is divided into byte-wide cells for transmission over the data lines. While the cells are transmitted over the data lines, a half-speed clock is transmitted over the clock line. Transitions in the half-speed clock occur during transmission of the cell data. The transitions are used by a receiving device to sample the byte-wide cells.

38 Claims, 7 Drawing Sheets

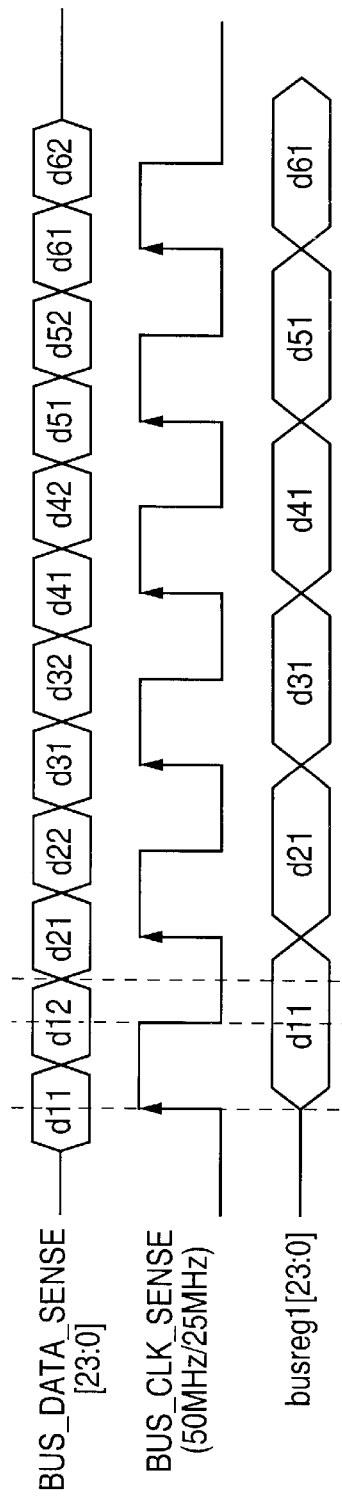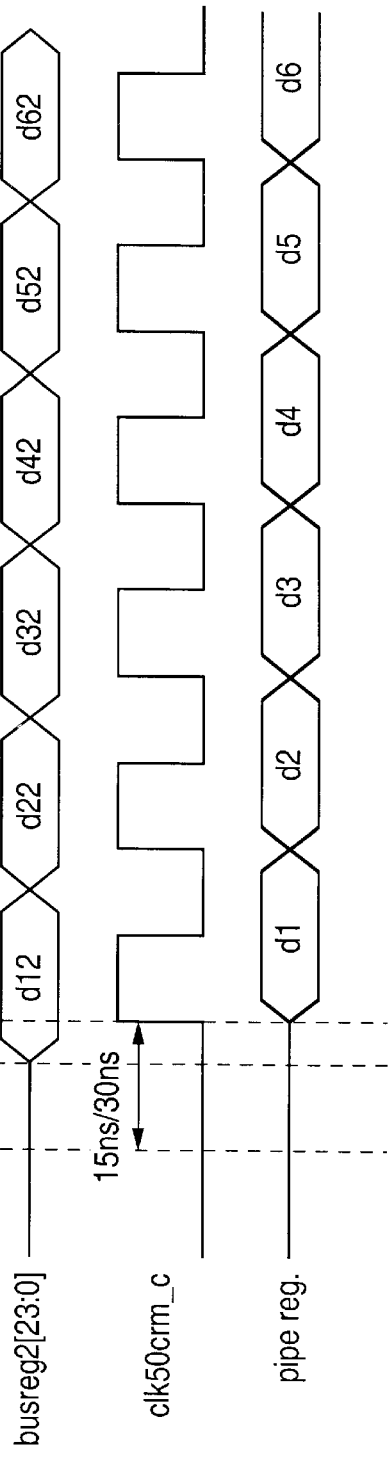

HIGH SPEED NETWORK SWITCH BUS CLOCK

FIELD OF THE INVENTION

The invention relates generally to transmitting data over a bus, and more specifically to transmitting a clock signal over the bus.

BACKGROUND OF THE INVENTION

Local Area Networks (LANs) are commonly used to interconnect computers or other devices. One computer may transmit a packet of data to another computer over the network. The packet includes a source address field, a destination address field, a data field, and other fields. The destination address field is used to route the packet to the appropriate destination.

A LAN may grow to include a large number of devices and to reach a large physical area. For example, a large number of personal computers may be interconnected over a LAN. The personal computers may be spread across a number of locations. As the number of devices increase so too does the demand for network bandwidth. As the distance between devices increases so to does signal degradation.

Network devices such as routers, hubs, switches, bridges, repeaters and others may be used to divide network traffic and boost network signals. For example, a network switch may be used to divide a network into sub-networks. As a packet may not need to be transmitted to every sub-network, the switch routes the packet to the appropriate sub-network (i.e. the sub-network having a device address which matches the packet's destination address). In this way, a switch is able to reduce traffic within a sub-network.

Such a switch requires a bus operative to route packet data to the appropriate sub-network. However, as each of the sub-networks may simultaneously transmit data, the bandwidth of the bus should exceed that of the sub-networks. For example, typical network devices are capable of transmitting data at 100 Mb/s. Where a large number of such devices are interconnected through a switch, the bus must operate at a relatively high speed.

A high-speed bus requires a clock signal so that data may be properly detected by receiving devices connected to the bus. As the bus operates at a high-speed, the clock signal may produce significant levels of electromagnetic interference (EMI). For example, on a bus operating at 100 Mbps with a corresponding clock signal at 100 MHz, both the data signals and the clock signal may produce significant levels of EMI. As EMI acts to degrade data signals and to interfere with other nearby circuitry, such EMI should be minimized.

A bus cable typically exhibits a low pass filter characteristic. Such a characteristic operates to delay higher-frequency signals more than lower frequency signals. As data signals exhibit a random distribution, they do not necessarily change state at each transition. Accordingly, a 100 Mbps data line will on average operate at a frequency lower than 100 MHz. Accordingly, the 100 MHz clock will experience more delay than the average data signals. As the clock is used to make sampling decisions on the data lines, the delay produces sub-optimal sampling.

Accordingly, a bus is desired which acts to effectively transmit data between sub-networks. The bus must operate to reduce the potential for transmission errors while at the same time provide adequate bandwidth to service a plurality of network devices. Moreover, the bus should operate to minimize EMI over the data bus and with other nearby circuitry.

SUMMARY OF THE INVENTION

According to one aspect of the invention, a data bus for transmitting data between a plurality of devices includes a plurality of data lines and a clock line. The plurality of data lines are configured to connect with a plurality of devices and to convey data signals at a bit rate between the plurality of devices. The clock line is configured to connect with the plurality of devices and to convey a clock signal at a fraction of the bit rate between the plurality of devices.

According to another aspect of the invention, a network device configured to convey data between a bus and a port includes a plurality of data paths, a clock path and a memory. The plurality of data paths are configured to receive data signals at a bit rate from other network devices. The clock path is configured to receive a clock signal at a fraction of the bit rate from the other network devices. The memory is operationally coupled with the plurality of data lines and the clock line. The memory has a first portion and a second portion. The memory is configured to receive one byte of data into the first portion after a first transition in the clock signal and to receive another byte of data into the second portion after a second transition in the clock signal.

According to another aspect of the invention, packet data is transmitted over a bus. The transmission includes transmitting a first data signal over a data bus at a bit rate. The transmission also includes transmitting a clock signal over a clock line at a fraction of the bit rate wherein the clock signal passes through a first transition during transmission of the first data signal. The transmission further includes transmitting a second data signal over the data bus wherein the clock signal passes through a second transition during transmission of the second data signal.

According to another aspect of the invention, a method of receiving packet data over a bus includes receiving a first data signal at a bit rate over the bus. The method also includes receiving a second data signal at the bit rate over the bus. The method further includes receiving a clock signal at a fraction of the bit rate over the bus. The method further includes sampling the first data signal during a first transition in the clock signal. The method further includes sampling the second data signal during a second transition in the clock signal, wherein the second transition occurs immediately following the first transition.

BRIEF DESCRIPTION OF THE DRAWINGS

FIGS. 5A–F together form a timing diagram of the clock and data signals transmitted over the switch bus of FIG. 4.

DETAILED DESCRIPTION

Figure 1:
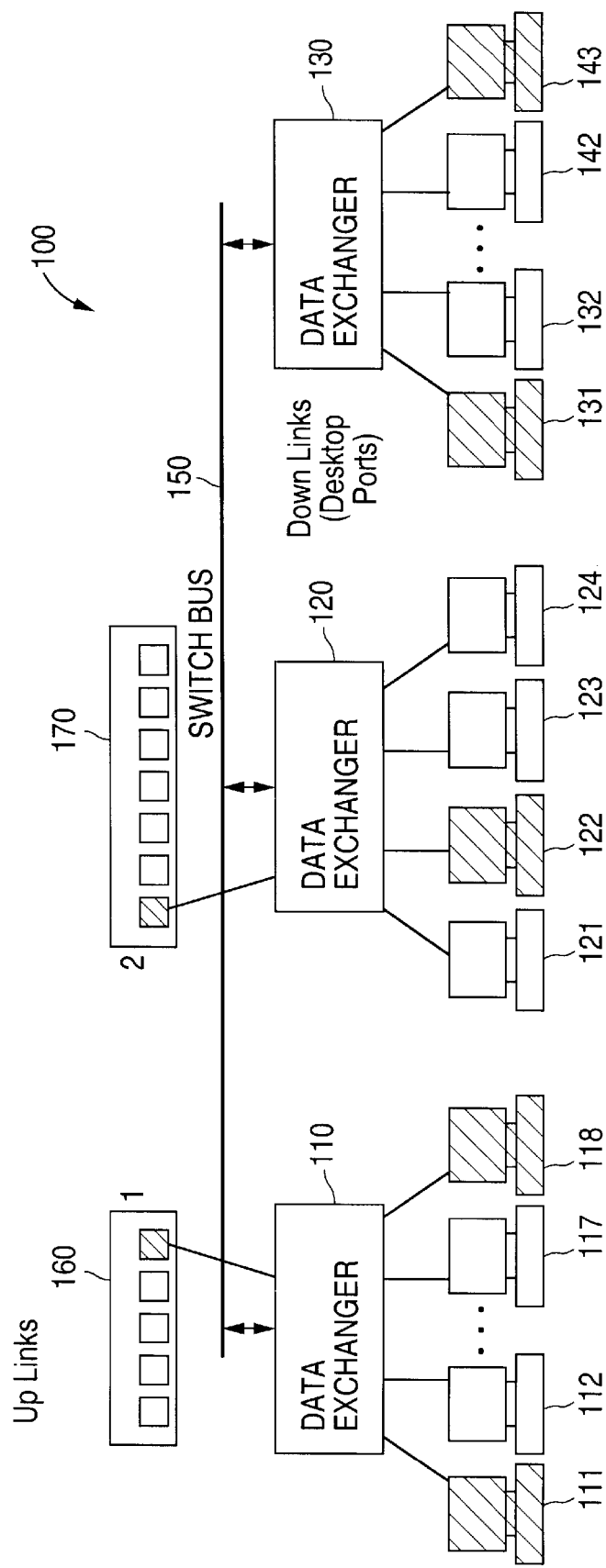
FIG. 1 is a block diagram of one preferred embodiment of a switched network including three data exchangers and two related up-links.

Turning to FIG. 1, one preferred embodiment of a switched network 100 including three data exchangers 110, 120 and 130 is described. Data exchangers 110, 120 and 130 connect over a switch bus 150, which allows the data exchangers 110, 120 and 130 to share data. Data exchangers 110, 120 and 130 each connect to a plurality of computers or other devices. Specifically, data exchanger 110 connects to computers 111–118 (113–116 not shown). Data exchanger 120 connects to computers 121–124. Data exchanger 130 connects to computers 131–143 (133–141 not shown).

Data exchangers 110, 120 and 130 are configured to route packet data between the computers. For example, computer 111 may transmit a packet of data with a destination address which matches that of computer 122. When properly routed, the packet passes through data exchanger 110, over switch bus 150, through data exchanger 120 and to computer 122. Other computers may communicate in a similar manner.

In one preferred embodiment, network 100 is configured so that any computer may communicate with any other computer. However, as the number of computers increases so to does the network traffic. Accordingly, in another preferred embodiment, network 100 is configured to define a plurality of virtual LANs (VLANs). Over a first VLAN, computers 111, 118, 122, 131 and 143 (each shown shaded) are able to communicate. Over a second VLAN, computers 112, 117, 121, 123, 124, 132 and 142 are able to communicate. The division of network 100 into two VLANs reduces traffic over each. This network may be further divided into additional VLANs depending upon the particular network demands.

Each of the computers shown in FIG. 1 may include a sub-network of computers or other devices. Thus, data exchangers 110, 120 and 130 may also act to interconnect sub-networks.

Data exchanger 110 and 120 include an up link 160 and 170, respectively. Up links 160 and 170 provide a connection to an upper-level network, such as an enterprise network. Data exchangers 110 and 120 will forward a packet to the upper-level network through up links 160 and 170, respectively, when the packet's destination address is not matched by another computer connected to switch bus 150. Data exchangers 110 and 120 will also forward multicast and broadcast packets through up links 160 and 170, respectively.

Figure 2:
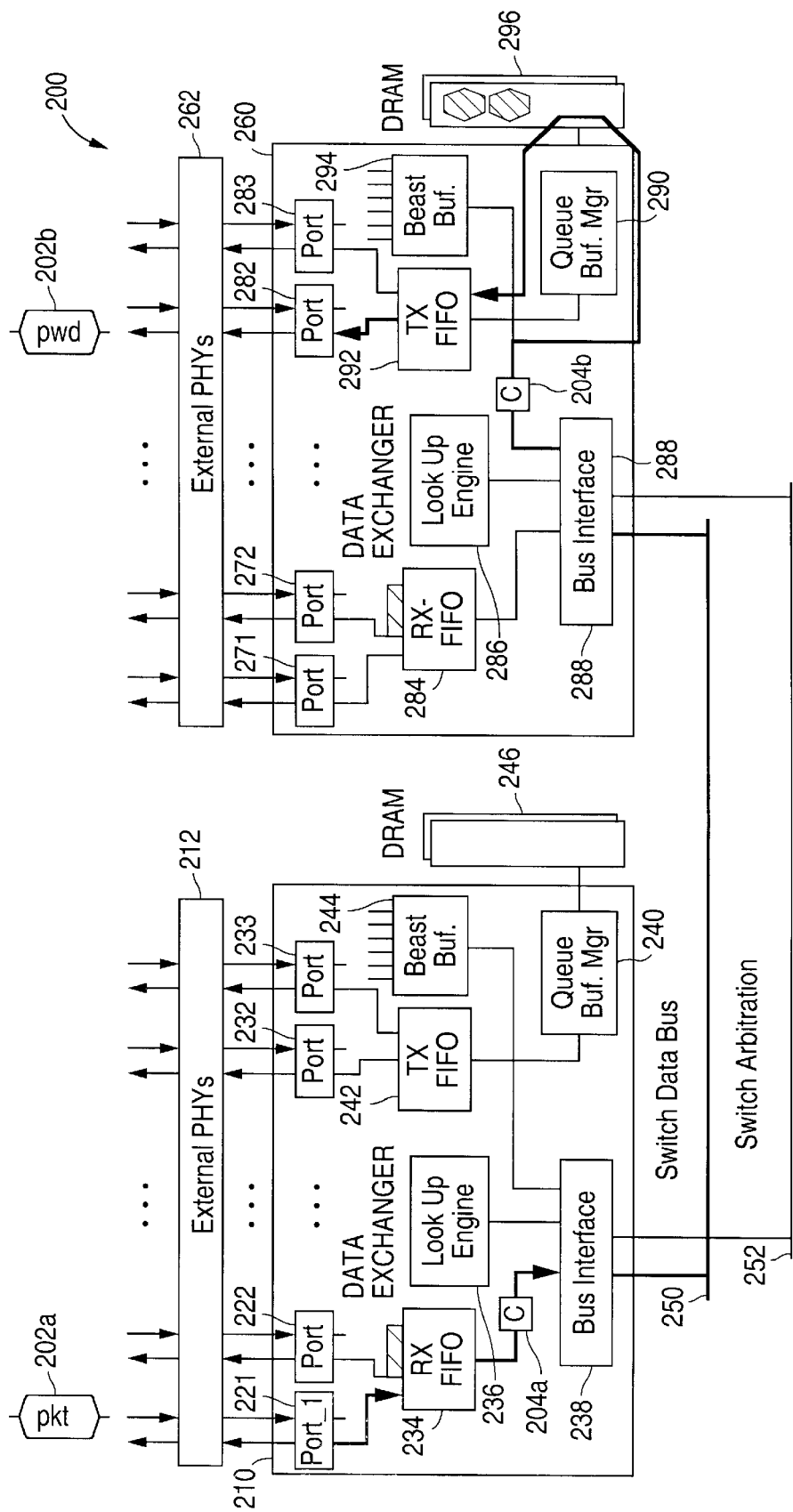
FIG. 2 is a block diagram of another preferred embodiment of a switched network including two data exchangers connected by a switch bus.

Turning to FIG. 2, another preferred embodiment of a switched network 200 will be described. The switched network 200 includes a first data exchanger 210 and a second data exchanger 260. As shown, the data exchangers 210 and 260 each include several functional blocks that enable high speed routing of packet data. These functional blocks may be implemented using commercially available components such as controllers or processors, or may be specially designed to perform the functionality herein described.

Data exchanger 210 and data exchanger 260 each provide a number of ports for connecting to external network devices. More specifically, data exchanger 210 provides ports 221–233 (ports 223–231 not shown), and data exchanger 260 provides ports 271–283 (ports 273–281 not shown). Ports 221–233 each connect to an external physical layer 212. As shown, the external physical layer 212 may consist of a single device operative to connect each port to a physical network. The physical layer 212 may also consist of a number of separate devices each operative to connect a single port to a network. The physical layer 212 provides the physical connection to a network, and provides a media independent interface to the ports 221–233. Each of ports 271–283 connect to an external physical layer 262. External physical layer 262 provides the same functionality as physical layer 212. Each of ports 221–233 and 271–283 provide media access control functionality for transmitting and receiving data over a network.

Data exchanger 210 connects to data exchanger 260 over a switch bus 250 and a switch arbitration link 252. As will be explained further below, packet data received through a port by data exchanger 210 may be transmitted to data exchanger 260 over switch bus 250. Data exchanger 260 may in turn transmit the packet data through one of its ports. In this way, a network device connected to one of ports 221–233 may transmit data to a device connected to one of ports 271–283. Likewise, a network device connected to one of ports 271–283 may transmit data to a device connected to one of ports 221–233. Although only two data exchangers are shown, additional data exchangers may be connected over switch bus 250 and switch arbitration link 252.

Data exchanger 210 includes a receive FIFO 234, a transmit FIFO 242, and a broadcast buffer 244. Receive FIFO 234 connects to each of the ports 221–233 to receive packet data. Receive FIFO 234 provides temporary storage of frame data prior to sending the data over switch bus 250.

Transmit FIFO 242 connects to each of ports 221–233 to transmit unicast frame data. Transmit FIFO 242 includes a separate FIFO for each port. Transmit FIFO 242 moves data from an external memory 246, through the appropriate FIFO, and to the appropriate port by using the destination address of the unicast frame data.

Broadcast buffer 244 connects to each of ports 221–233 to transmit broadcast and multicast frame data. Broadcast buffer 244 includes a 10 Mb/s and a 100 Mb/s FIFO. These FIFOs also move data from external memory 246 to the appropriate ports.

Bus interface 238 transfers data from receive FIFO 234 to switch bus 250. Bus interface 238 provides low-voltage high-bandwidth drivers for sending data over switch bus 250. Bus interface 238 also reads data from switch bus 250. Bus interface 238 provides header data to the look-up engine 236, and provides frame data to transmit buffer 242 and broadcast buffer 244.

As will be explained further below, bus interface 238 accesses the look-up engine 236 to determine whether to accept data from the switch bus and to maintain a routing table. If the data is accepted, the bus interface 238 uses the header data to give buffer manager 240 routing instructions.

Based on the routing instructions, buffer manager 240 stores the data in external memory 246. Buffer manager 240 also tracks memory usage and controls queues in the external memory 246. The queues are used to store data for congested ports.

Data exchanger 260 includes functional blocks that act in the same manner as those of data exchanger 210. Specifically, data exchanger 260 includes a receive FIFO 284, a look-up engine 286, a bus interface 288, a buffer manager 290, a transmit FIFO 292, a broadcast buffer 294, and an external memory 296. These blocks function in the same manner as receive FIFO 234, look up-engine 236, bus interface 238, buffer manager 240, transmit FIFO 242, broadcast buffer 244, and external memory 246, respectively.

The path of a single unicast packet will now be described as it moves from data exchanger 210 to data exchanger 260. To start, a packet 202a is received by the external physical layer 212. When operating properly, a first packet will be received completely before another packet is received by the same port. The external physical layer 212 translates the packet 202a into frame data, which is provided over a media independent interface to port 221. The translation converts the media dependent packet data into nibble wide NRZ format.

Port 221 monitors the incoming data for a start-of-frame delimiter (SFD). Upon receipt of the SFD, port 221 divides the frame data into 48-bit cells. The cells are then passed to receive FIFO 234. When the number of cells in receive FIFO 234 exceeds a drain threshold, data exchanger 210 asserts a switch bus request over switch arbitration link 252. If it wins an arbitration, it will then transmit the first cell 204a stored in receive FIFO 234 over switch bus 250. Receive FIFO 234 will continue transmitting cells until all cells have been transmitted.

Data exchanger 260 monitors switch bus 250. Look-up engine 286 parses the first cell 204b to determine whether the destination address field matches that of any active devices connected to ports 271–283. In this example, look-up engine 286 determines that the destination address field matches that of an active device connected to port 282. In response, look-up engine 286 provides a match signal back to data exchanger 210, and directs buffer manger 290 to reserve a buffer in memory 296. The buffer in memory 296 is large enough to store the entire frame in contiguous memory locations. As subsequent cells from the same frame are received, the buffer manager 290 sequentially stores the cells in the contiguous memory locations.

When the number of cells stored in the buffer exceed a drain threshold, the data is passed to transmit FIFO 292. Again, the transmit FIFO 292 includes a separate FIFO for each of ports 271–283. The data is provided to the transmit FIFO associated with port 282. The transmit FIFO associated with port 282 converts the 48-bit wide data to nibble wide data. This data is provided over a media independent interface to the physical layer 262. The physical layer 262 translates the data into a packet 202b, which is transmitted over a network connection.

Broadcast or multicast packets have a similar data flow. The buffer manager 290 stores the cell data into contiguous memory locations within memory 296. When the number of cells stored in the memory 296 exceed a drain threshold, the data is passed to broadcast buffer 294 instead of transmit FIFO 292. Again, broadcast buffer 294 includes a 10 Mb/s buffer and a 100 Mb/s buffer. Both of these buffers provide the data to ports 271–283. Depending upon the external physical layer 262, the respective port provides either the 10 Mb/s or the 100 Mb/s data over a media independent interface to the physical layer 262. The physical layer 262 translates the data into packets, which are transmitted over the respective network connection.

In another preferred embodiment, a data exchanger is configured so that all packet data received over a switch bus is passed through the look-up engine. The look-up engine then provides the packet data and control signals to the other modules.

Figure 3:
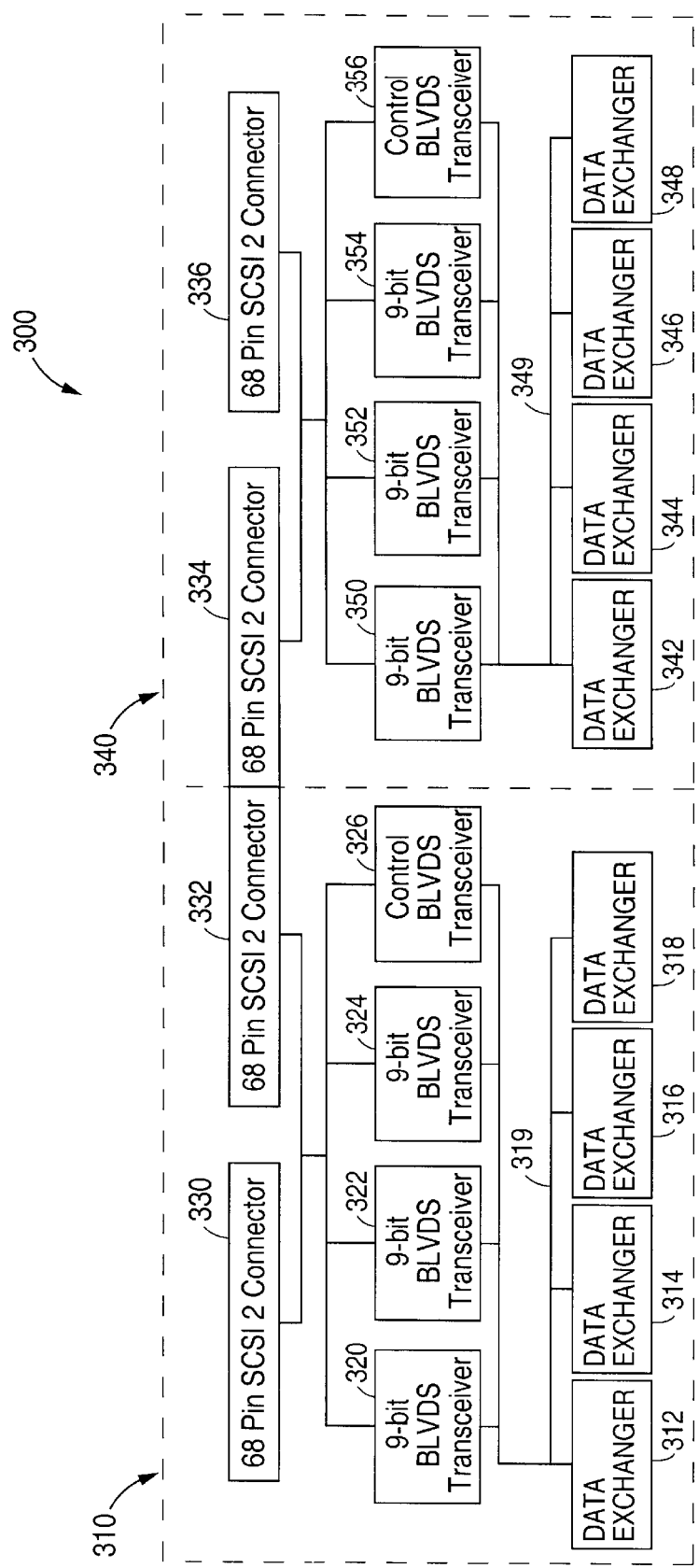
FIG. 3 is a block diagram of another preferred embodiment of a switched network including two sub-networks connected over a SCSI bus.

Turning to FIG. 3, another preferred embodiment of a switched network 300 is described. The switched network 300 is subdivided into two sub-networks 310 and 340. Sub-network 310 includes data exchangers 312–318 which are housed within a single box. The data exchangers communicate over a switch bus 319 using 3V TTL compatible signaling. Each data exchanger 312–318 is configured to connect to a plurality of network devices via one or more ports (not shown).

Sub-network 340 similarly includes data exchangers 342–348 which are housed within a single box. These data exchangers communicate over a switch bus 349 using 3V TTL compatible signaling. Each data exchanger 342–348 is configured to connect to a plurality of network devices over ports (not shown).

Sub-networks 310 and 340 each provide an interface to communicate with other sub-networks. More specifically, sub-network 310 provides transceivers 320–326 which connect to switch bus 319. The transceivers provide low-voltage high-bandwidth amplification for the interconnection with other switch buses. Similarly, sub-network 340 provides transceivers 342–348 which connect to switch bus 349. Transceivers 320–326 connect to transceivers 350–356 through connectors 332 and 334. Connectors 332 and 334 are 68-pin SCSI connectors.

Sub-networks 310 and 340 also include connectors 330 and 336, respectively. These connections are provided to link other sub-networks to the switch bus. In a preferred embodiment a maximum of six sub-networks may be interconnected and the maximum connection distance between transceivers is 18 inches. A greater number of devices or a greater distance between transceivers may act to degrade the communication links.

Figure 4:
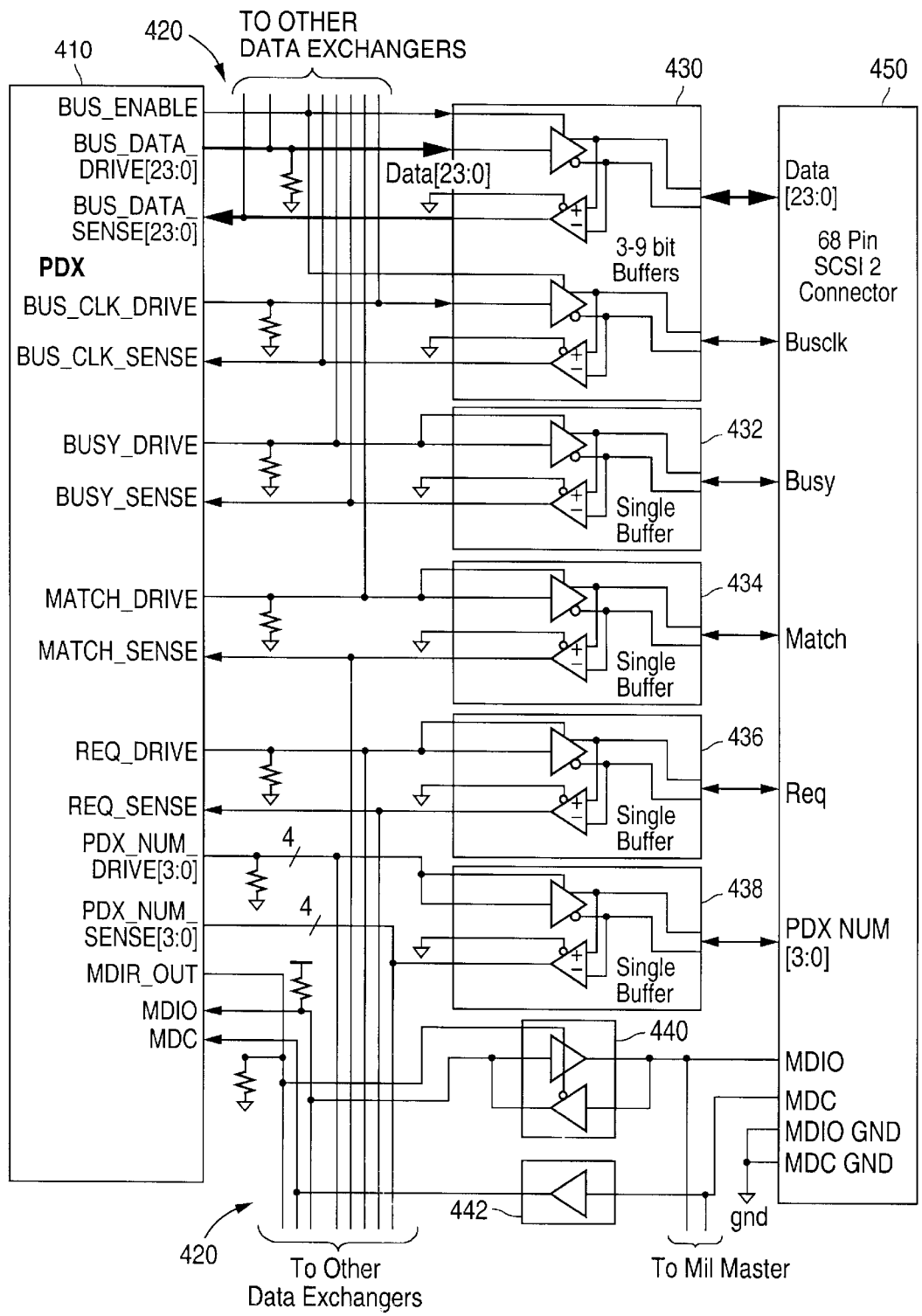
FIG. 4 is a circuit diagram of one preferred embodiment of connections between a data exchanger and a SCSI connector, including a portion of a switch bus.

Turning to FIG. 4, one preferred embodiment of the switch bus interface between a data exchanger 410 and a connector 450 is described. Data exchanger 410 provides a number of signals to switch bus 420 and to transceivers 430–440. Each of these signals will now be briefly described.

The BUS_ENABLE signal is activated when data exchanger 410 is mastering switch bus 420. This signal is used to enable external transceivers to amplify clock and data signals.

The BUS_DATA_DRIVE lines provide 24 data bits. When data exchanger 410 is mastering the switch bus 420, these lines contain cell data from data exchanger 410. The BUS_DATA_SENSE lines receive 24 data bits. When another data exchanger is mastering the switch bus 420, these lines contain cell data from that data exchanger. Data exchanger 410 uses these lines to receive cell data from that other data exchanger.

The BUS_CLK_DRIVE line provides a clock signal to coordinate data transfers. When data exchanger 410 is mastering the switch bus 420, it provides a half-speed clock signal over the BUS_CLK_DRIVE line. The half-speed clock signal will be further described below. The BUS_CLK_SENSE line receives the half-speed clock signal when another data exchanger is mastering the switch bus 420.

The BUSY_DRIVE and BUSY_SENSE lines are used by a receiving data exchanger when its content-addressable-memory generates a match but it does not have memory resources available to handle incoming cell data. When the mastering data exchanger senses this signal, it will complete the current bus transaction and retry the cell later.

The MATCH_DRIVE and MATCH_SENSE lines are used by a receiving data exchanger to indicate that the destination address of the current SOF cell matches a content-addressable-memory location within that data exchanger. When the mastering data exchanger receives this signal, it will continue to transmit subsequent cell data for receipt by the data exchanger which generated the match.

The REQ_DRIVE and REQ_SENSE lines are used to start bus arbitration. A mastering data exchanger will activate this signal before beginning data transmission.

The PDX_NUM_DRIVE and PDX_NUM_SENSE lines are used during bus arbitration to determine which data exchanger may act as the next bus master. Each data exchanger provides its number and the lowest number on the bus wins the arbitration.

The MDIO line provides the serial data interface for receiving command data from a host processor. The MDIO acts as a slave media independent interface. The MDC line receives a clock signal for the MDIO line. The MDIR_OUT line acts as a direction control for external buffers connected to the MDIO and MDC lines. The MDIR_OUT is asserted during a read of the data exchanger.

Each of the above-described lines are buffered and provided to connector 450. Specifically, the BUS_ENABLE, BUS_DATA_DRIVE, BUS_DATA_SENSE, BUS_CLK_DRIVE and BUS_CLK_SENSE lines are amplified by buffer 430. The BUSY_DRIVE and BUSY_SENSE lines are amplified by buffer 432. The MATCH_DRIVE and MATCH_SENSE lines are amplified by buffer 434. The REQ_DRIVE and REQ_SENSE lines are amplified by buffer 436. The PDX_NUM_DRIVE and PDX_NUM_SENSE lines are amplified by buffer 438. The MDIR_OUT and MDIO lines are amplified by buffer 440. The MDC line is amplified by buffer 442.

These buffers act to amplify the respective signals so that a plurality of data exchangers, housed in separate boxes, may communicate. In a preferred embodiment, the cable interconnecting the boxes has a bandwidth of over 100 MHz for links up to six feet, which is sufficient to stack six boxes with 18" cable between boxes. The group delays are constant up to 100 MHz, so no equalization is required in the receiving data exchanger. The cable delay (about 11.25 ns for 7.5') itself is overcome, since a bus mastering data exchanger sources both data and clock. Moreover, as will be further described below, the clock is provided at half-speed so that its delay more closely matches that of the data.

Turning to FIGS. 5A–5F, the preferred timing diagrams for transmitting and receiving data over a switch bus will be described. As shown in FIG. 5A, data is transmitted over the switch bus at 100 Mb/s. As the switch bus provides 24 data lines, the switch bus is able to transmit simultaneously 24 bits of data. To transmit a 48-bit word, a transmitting data exchanger divides the 48-bit word into two 24-bit bytes. As also shown in FIG. 5A, a first data word is divided into a first byte d11 and a second byte d12. A second data word is similarly divided into a first byte d21 and a second byte d22. Subsequent data words are similarly divided into bytes. The transmitting data exchanger also provides a half-speed sampling clock. As shown in FIG. 5B, the clock operates at one-half the speed of the data. The clock is timed so that the clock provides a positive transition which is centered during the transmission of the first byte d11 and a negative transition which is centered during the transmission of the second byte d12. Similarly, the clock provides a positive transition which is centered during the transmission of the first byte d21 and a negative transition which is centered during the transmission of the second byte d22.

As shown, the data signals d11–d62 may be asserted in either a high or a low state. When the data signals change state, they pass through a transition. After the transition, the data signal remains substantially constant in an assertion state. During the assertion state, the data signal is valid and a receiving device may sample the data signal at any point during the assertion state. In the preferred embodiment, the clock transitions are centered on the assertion state. The clock operates at a fifty-percent duty cycle, so that a first transition is centered during a first assertion state and the next transition is centered during the next assertion state.

As will be further explained below, a receiving data exchanger uses the positive clock transitions to write data to a first byte register. The receiving data exchanger uses the negative clock transitions to write data to a second byte register. FIGS. 5C and 5D show the contents of the first and second byte registers, respectively.

The receiving data exchanger also creates a delayed version of the half-speed clock signal. The delayed clock is used to coordinate transfers from the first and second byte registers to a 48-bit (word wide) pipe register. Upon detection of a positive transition in the delayed clock, data from the first and second byte registers are copied to the pipe register. The contents of the first byte register are copied to the first byte of the pipe register and the contents of the second byte register are copied to the second byte of the pipe register. FIG. 5E shows the delayed clock signal. FIG. 5F shows the contents of the pipe register.

The data exchanger may also generate a further delay of the clock signal for use in copying the contents of the pipe register to an elasticity buffer in an associated RAM.

Figure 6:
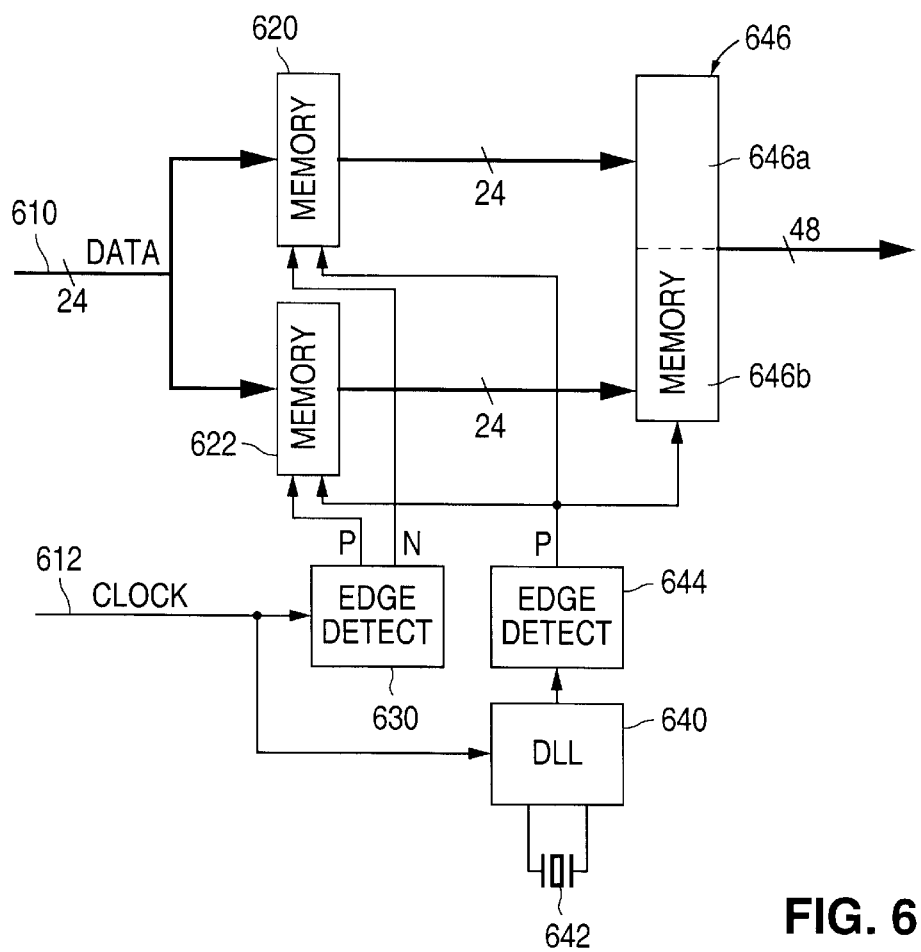
FIG. 6 is a circuit diagram of one preferred embodiment of a data receive circuit.

Turning to FIG. 6, a preferred embodiment of a data receive circuit is described. Data is received from a 24-bit switch bus 610. The switch bus 610 provides the data to a first byte register 620 and a second byte register 622. A half-speed clock is received over line 612. The half-speed clock is provided to control circuit 630. Control circuit 630 acts to detect positive and negative transitions in the half-speed clock signal. Upon detection of a positive transition, control circuit 630 provides a write signal to first byte register 620. In response, first byte register 620 writes data from the switch bus 610 into its memory. Upon detection of a negative transition, control circuit 630 provides a write signal to second byte register 622. In response, second byte register 622 writes data from the switch bus 610 into its memory.

The half-speed clock signal is also provided to delay 640. Delay 640 includes a delay lock loop circuit which operates on an external 50 MHz crystal clock 642. When operating in a 100 MHz mode (half speed clock at 50 MHz), the delay 640 generates a 15 ns delay of the half-speed clock. The 15 ns delayed half-speed clock is provided to control circuit 644. Upon detection of a positive transition, control circuit 644 provides a read signal to first byte register 620 and second byte register 622. Control circuit 644 simultaneously provides a write signal to word register 646. In response to the read signals, first byte register 620 and second byte register 622 provide their contents to word register 646. In response to the write signal, word register 646 writes the data into its memory. The first byte is written to a first portion 646a, and the second byte is written to a second portion 646b.

The delay circuit 640 may also provide further delay of the half-speed clock to the control circuit 644. This signal is used by the control circuit 644 to control a data read from the word register 646 and a write of that data into an associated RAM.

Figure 7:
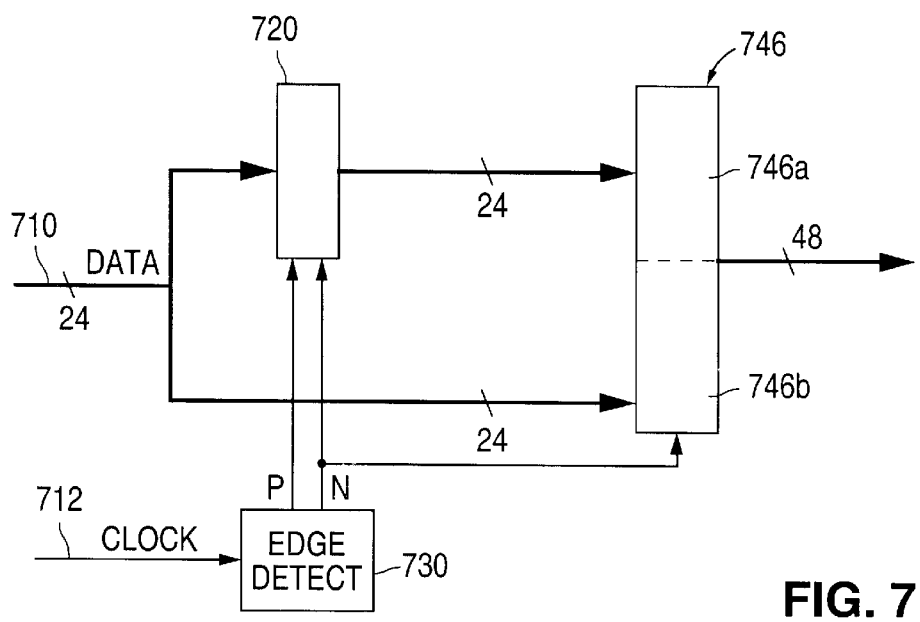
FIG. 7 is a circuit diagram of another preferred embodiment of a data receive circuit.

Turning to FIG. 7, another preferred embodiment of a data receive circuit is described. Data is received from a 24-bit switch bus 710. The switch bus provides the data to a first byte register 720 and a second byte portion 746b of word register 746. A half-speed clock is received over line 712.

The half-speed clock is provided to control circuit 730. Control circuit 730 acts to detect positive and negative transitions in the half-speed clock signal. Upon detection of a positive transition, control circuit 730 provides a write signal to first byte register 720. In response, first byte register 720 writes data from the switch bus 710 into its memory. Upon detection of a negative transition, control circuit 730 provides a read signal to first byte register 720 and a write signal to word register 746. In response, first byte register 720 provides its contents to a first byte portion 746*a* of word register 746. Word register 746 writes this data into the first byte portion 746*a*. Simultaneously, the word register 746 writes data from the switch bus to a second byte portion 746*b*. After completion of this write, the word register 746 holds one word of data.

The control circuit 730 may also provide a signal to control writes from the word register 746 into an associated RAM.

Figure 8:
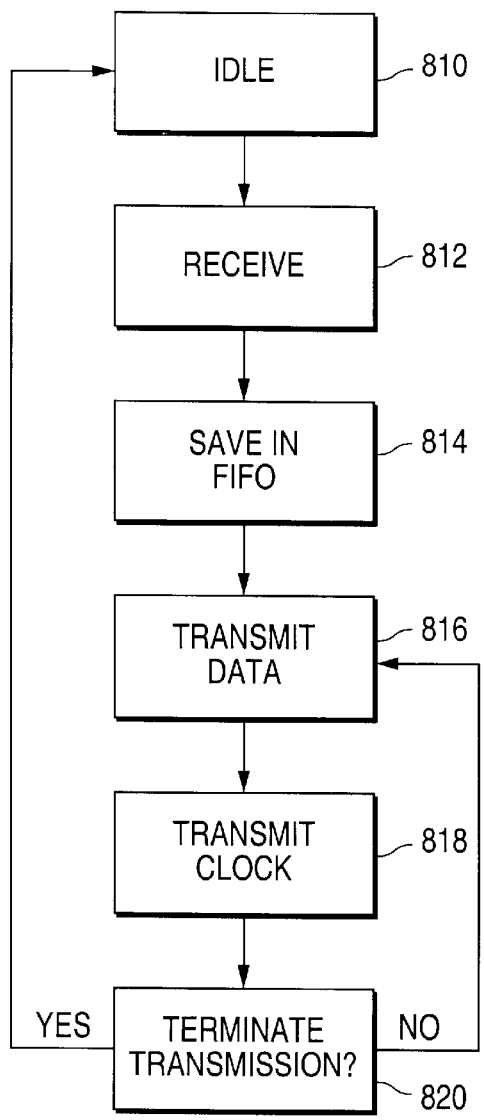
FIG. 8 is a flow chart of the preferred operation of a data exchanger transmitting data over a switch bus.

Turning to FIG. 8, the preferred operation of a data exchanger transmitting data over a switch bus is described. At block 810, the data exchanger operates in an idle state. Here, the data exchanger monitors its ports for incoming packet data. At block 812, the data exchanger receives such data. At block 814, the data exchanger divides the incoming data into byte-wide data and stores the byte wide data in a FIFO. At block 816, the data exchanger waits to become the master on the switch bus. Upon becoming the bus master, the data exchanger provides the byte-wide data over the switch bus. At block 818, the data exchanger simultaneously provides a half-speed clock signal. Positive transitions of the half-speed clock signal occur during transmission of the first byte of a data word. Negative transitions occur during transmission of the second byte of a data word.

At block 820, the data exchanger determines whether the transmission has completed. If so, the data exchanger terminates control of the switch bus and returns to idle state 810. Otherwise, the data exchanger continues transmitting data at block 816.

Figure 9:
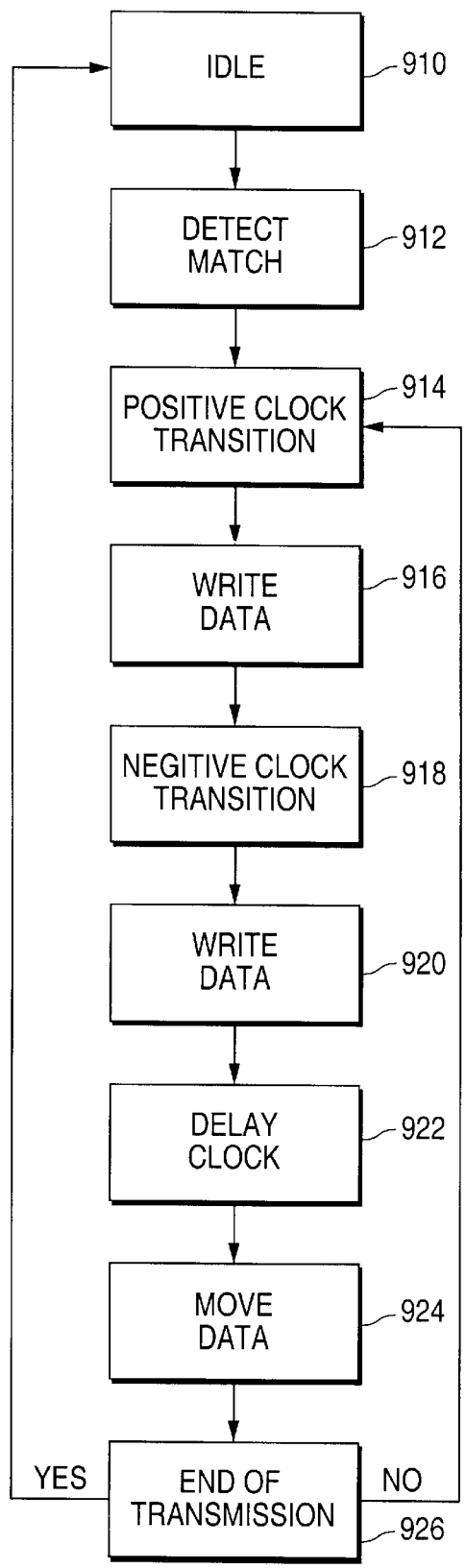
FIG. 9 is a flow chart of the preferred operation of a data exchanger receiving data over a switch bus.

Turning to FIG. 9, the preferred operation of a data exchanger receiving data over a switch bus is described. At block 910, the data exchanger operates in an idle state. Here, the data exchanger monitors a switch bus for incoming cell data. Upon receipt of a start-of-frame cell, the data exchanger compares the destination address to its content addressable memory. At block 912, the data exchanger detects a match. Accordingly the data exchanger will receive the data for transmission to a device connected to one of its ports.

At block 914, the data exchanger detects a positive transition on a half-speed clock signal. In response, at block 916, the data exchanger writes the data from the switch bus to a first byte register. At block 918, the data exchanger detects a negative transition on the half-speed clock signal. In response, at block 920, the data exchanger writes data from the switch bus to a second byte register. At block 922, the data exchanger generates a delayed version of the half-speed clock signal. Upon positive transitions of the delayed half-speed clock signal, at block 924, the data exchanger writes the contents of the first and second byte registers to a word register. At block 926, the data exchanger determines whether current cell has completed transmission, if so the data exchanger returns to idle state 910. Otherwise, the data exchanger returns to block 914, to continue receiving data from the switch bus.

Although the embodiments described herein are with reference to a data exchanger having a specific structure, the present invention can be implemented in a variety of other network devices without departing from the scope of the invention. Such other network devices may implement the invention using the functional blocks described herein or may implement other configurations to perform the same functionality. Those having ordinary skill in the art will certainly understand from the embodiments disclosed herein that many modifications are possible without departing from the teachings hereof. All embodiments and all such modifications are intended to be encompassed within the following claims.

We claim:

1. A network device configured to convey data between a bus and a port, the network device comprising:
   a plurality of data paths configured to receive data signals at a bit rate from other network devices;
   a clock path configured to receive a clock signal at a fraction of the bit rate from the other network devices; and
   a memory operationally coupled with the plurality of data lines and the clock line and having a first portion and a second portion wherein the memory is configured to receive one byte of data into the first portion after a first transition in the clock signal and to receive another byte of data into the second portion after a second transition in the clock signal.

2. The network device of claim 1, wherein the plurality of data paths comprise a plurality of amplifiers operative to buffer the data signals.

3. The network device of claim 1, wherein the clock path comprises an amplifier operative to buffer the clock signal.

4. The network device of claim 1, wherein the memory comprises a register.

5. The network device of claim 1, wherein the memory comprises a RAM.

6. The network device of claim 1, wherein the fraction of the bit rate comprises one-half and wherein the first transition comprises a positive transition and the second transition comprises a corresponding negative transition.

7. The network device of claim 1, wherein
   the plurality of data lines are further configured to transmit data signals to the other network devices; and
   the clock line is further configured to transmit the clock signal to the other network devices, wherein the clock passes through a first transition during transmission of a first byte of data over the plurality of data lines and the bus clock passes through a second transition during transmission of a second byte of data over the plurality of data lines.

8. A method of transmitting packet data over a bus comprising the steps of:
   transmitting a first data signal over a data bus at a bit rate;
   transmitting a clock signal over a clock line at a fraction of the bit rate wherein the clock signal passes through a first transition during transmission of the first data signal; and
   transmitting a second data signal over the data bus wherein the clock signal passes through a second transition during transmission of the second data signal.

9. The method of claim 8, wherein in the step of transmitting a clock signal, one of the first and second transitions in the clock signal comprises a positive transition and the other of the first and second transitions comprises a negative transition.

10. The method of claim 8, wherein the fraction of the bit rate comprises one-half.

11. The method of claim 8, wherein the first and second transitions in the clock signal occur approximately midway during the step of transmitting a first data signal and transmitting a second data signal, respectively.

12. A method of transmitting packet data over a bus comprising the steps of:

transmitting a first data signal over a data bus at a bit rate;

transmitting a clock signal over a clock line at a fraction of the bit rate wherein the clock signal passes through a first transition during transmission of the first data signal;

transmitting a second data signal over the data bus wherein the clock signal passes through a second transition during transmission of the second data signal;

receiving packet data via a port; and dividing the packet data into a plurality of cells, and wherein in the step of transmitting a first data signal, the first data signal comprises a first one of the plurality of cells.

13. The method of claim 12, wherein in the step of transmitting a second data signal, the second data signal comprises a second one of the plurality of cells.

14. A method of receiving packet data over a bus comprising the steps of:

receiving a first data signal at a bit rate over a bus;

receiving a second data signal at the bit rate over the bus;

receiving a clock signal at a fraction of the bit rate over the bus;

sampling the first data signal during a first transition in the clock signal; and sampling the second data signal during a second transition in the clock signal, wherein the second transition occurs immediately following the first transition.

15. The method of claim 14, wherein the step of receiving a first data signal comprises writing the first data signal into a first portion of a memory, and the step of receiving a second data signal comprises writing the second data signal into a second portion of the memory.

16. The method of claim 14, wherein the step of receiving a clock signal comprises receiving a clock signal having an approximately fifty-percent duty cycle.

17. The method of claim 14, wherein the step of sampling the first data signal occurs at approximately a midpoint of the first data signal, and the step of sampling the second data signal occurs at approximately a midpoint of the second data signal.

18. The method of claim 14, wherein the fraction of the bit rate comprises one-half.

19. The method of claim 14, further comprising the step of transmitting the first and second data signal as a packet to a network device.

20. A data bus driver comprising:

a bus having n data lines and a clock line; and a device connected to the bus, the device transmitting a series of n-bit data words onto the data lines, the n-bit data words including a first n-bit data word of the series and a second n-bit data word of the series, the device transmitting a clock signal having a series of edges onto the clock line, the edges including a first edge of the series of edges that transition from a first voltage level to a second voltage level and a second edge of the series of edges that transition from the second voltage level to the first voltage level, the device transmitting the first n-bit data word onto the data lines so that only the first edge occurs during the transmission of the first n-bit data word, and transmitting the second n-bit data word onto the data lines so that only the second edge occurs during the transmission of the second n-bit data word.

21. The data bus driver of claim 20, and wherein each data word is transmitted during a transmission period, and wherein an edge occurs substantially during a center of the transmission period.

22. The data bus driver of claim 21, and wherein the first edge is a rising edge and the second edge is a falling edge.

23. The data bus driver of claim 20, and wherein the first edge is a rising edge and the second edge is a falling edge.

24. A data bus system comprising:

a bus having n data lines and a clock line; and a plurality of devices connected to the bus, each device transmitting a series of n-bit data words onto the data lines at different times, the n-bit data words including a first n-bit data word of the series and a second n-bit data word of the series, the device transmitting a clock signal having a series of edges onto the clock line, the edges including a first edge of the series of edges that transitions from a first voltage level to a second voltage level and a second edge of the series of edges that transitions from the second voltage level to the first voltage level, the device transmitting the first n-bit data word onto the data lines so that only the first edge occurs during the transmission of the first n-bit data word, and transmitting the second n-bit data word onto the data lines so that only the second edge occurs during the transmission of the second n-bit data word.

25. The data bus system of claim 24, and wherein the series of n-bit data words and the clock signal is receivable from each device.

26. The data bus system of claim 25, and wherein each data word is transmitted during a transmission period, and wherein an edge occurs substantially during a center of the transmission period.

27. The data bus system of claim 24, and wherein the first edge is a rising edge and the second edge is a falling edge.

28. A method of transmitting a series of n-bit data words and a clock signal onto a bus having n data lines and a clock line from a device connected to the bus, the n-bit data words including a first n-bit data word of the series and a second n-bit data word of the series, the clock signal having a series of edges, the edges including a first edge of the series of edges that transitions from a first voltage level to a second voltage level and a second edge of the series of edges that transitions from the second voltage level to the first voltage level, the method comprising the steps of:

transmitting the first n-bit data word onto the data lines and the clock signal onto the clock line from the device so that only the first edge occurs during the transmission of the first n-bit data word, and transmitting the second n-bit data word onto the data lines and the clock signal onto the clock line from the device so that only the second edge occurs during the transmission of the second n-bit data word.

29. The method of claim 28, and wherein each data word is transmitted during a transmission period, and wherein an edge occurs substantially during a center of the transmission period.

30. The method of claim 29, and wherein the first edge is a rising edge and the second edge is a falling edge.

31. The method of claim 28, and wherein the first edge is a rising edge and the second edge is a falling edge.

32. The data bus driver of claim 20, and wherein each data word is transmitted during a corresponding transmission period, and wherein the first edge occurs substantially during a center of the transmission period of the first n-bit data word and the second edge occurs substantially during a center of the transmission period of the second n-bit data word.

33. The data bus driver of claim 21, and wherein the first edge is a rising edge and the second edge is a falling edge.

34. The data bus system of claim 25, and wherein each data word is transmitted during a corresponding transmission period, and wherein the first edge occurs substantially during a center of the transmission period of the first n-bit data word and the second edge occurs substantially during a center of the transmission period of the second n-bit data word.

35. The method of claim 28, and wherein each data word is transmitted during a corresponding transmission period, and wherein the first edge occurs substantially during a center of the transmission period of the first n-bit data word and the second edge occurs substantially during a center of the transmission period of the second n-bit data word.

36. The method of claim 35, and wherein the first edge is a rising edge and the second edge is a falling edge.

37. A data bus for transmitting data between a plurality of devices, comprising:

a plurality of data lines configured to connect with a plurality of devices and to convey data signals at a bit rate between the plurality of devices; and a clock line configured to connect with the plurality of devices and to convey a clock signal at a fraction of the bit rate between the plurality of devices, and wherein the plurality of data lines and the clock line are further configured to receive the data signals and the clock signal, respectively, from any one of the plurality of devices, and wherein clock signal transitions occur during an assertion state of the data signals, and wherein the clock signal transitions are substantially centered on the assertion state of the data signals, and wherein a positive transition in the clock signal occurs during data signals of one byte and a negative transition in the clock signal occurs during data signals of another byte.

38. The data bus of claim 37, and wherein the fraction of the bit rate comprises one-half.

\* \* \* \* \*